(12) United States Patent
Gallo

(10) Patent No.: US 12,159,081 B2
(45) Date of Patent: Dec. 3, 2024

(54) SYSTEMS AND METHODS FOR MULTI-PROTOCOL ARBITRATION FOR HEARING DEVICES

(71) Applicant: SONOVA AG, Staefa (CH)

(72) Inventor: Alessandro Gallo, Murten (CH)

(73) Assignee: Sonova AG, Staefa (CH)

( * ) Notice: Subject to any disclaimer, the term of this patent is extended or adjusted under 35 U.S.C. 154(b) by 160 days.

(21) Appl. No.: 17/799,218

(22) PCT Filed: Feb. 24, 2020

(86) PCT No.: PCT/IB2020/051566
§ 371 (c)(1),
(2) Date: Aug. 11, 2022

(87) PCT Pub. No.: WO2021/171058
PCT Pub. Date: Sep. 2, 2021

(65) Prior Publication Data
US 2023/0084332 A1    Mar. 16, 2023

(51) Int. Cl.
*G06F 3/16* (2006.01)
*H04R 25/00* (2006.01)

(52) U.S. Cl.
CPC ........... *G06F 3/165* (2013.01); *H04R 25/554* (2013.01)

(58) Field of Classification Search
None
See application file for complete search history.

(56) References Cited

U.S. PATENT DOCUMENTS

| | | |
|---|---|---|
| 6,741,554 B2 | 5/2004 | D'Amico et al. |
| 10,009,141 B2 | 6/2018 | Choi |
| 10,178,711 B2 | 1/2019 | Li et al. |
| 10,341,758 B1 | 7/2019 | Tong et al. |
| 10,348,370 B2 | 7/2019 | Thoen et al. |

(Continued)

FOREIGN PATENT DOCUMENTS

| | | |
|---|---|---|
| EP | 3133760 | 2/2017 |
| EP | 2119200 | 4/2018 |

(Continued)

OTHER PUBLICATIONS

"International Search Report and Written Opinion received in International Application No. PCT/IB2020/051560 received Sep. 25, 2020."

(Continued)

*Primary Examiner* — Hemant S Patel
(74) *Attorney, Agent, or Firm* — ALG Intellectual Property, LLC

(57) ABSTRACT

An exemplary hearing device is configured to concurrently maintain a first link with a source and a second link with a second hearing device. The hearing device scans, while not receiving data via the first link, the second link for a preamble of a binaural data packet for a first time period. Based on whether the preamble is detected, the hearing device selectively: receives the binaural data packet and ignores the first link while receiving the binaural data packet if the preamble of the binaural data packet is detected during the first time period; and scans the first link for a preamble of a data packet for a second time period if the preamble of the binaural data packet is not detected during the first time period.

18 Claims, 4 Drawing Sheets

(56) References Cited

U.S. PATENT DOCUMENTS

| | | |
|---|---|---|
| 10,412,567 B1 | 9/2019 | Tong |
| 2006/0280204 A1 | 12/2006 | Nagata |
| 2009/0034498 A1 | 2/2009 | Banerjea et al. |
| 2012/0058727 A1* | 3/2012 | Cook .................. H04L 1/16 |
| | | 455/41.3 |
| 2015/0319557 A1 | 11/2015 | El-Hoiydi |
| 2016/0044426 A1 | 2/2016 | Duchscher et al. |
| 2017/0077952 A1 | 3/2017 | Hammerschmidt |
| 2018/0084456 A1* | 3/2018 | Gostev .................. H04L 1/1867 |
| 2018/0317126 A1 | 11/2018 | Wang |
| 2019/0044576 A1 | 2/2019 | Thoen et al. |
| 2019/0104423 A1 | 4/2019 | Hariharan |
| 2019/0159285 A1 | 5/2019 | Li et al. |
| 2019/0207835 A1 | 7/2019 | Lohiya et al. |
| 2019/0317126 A1 | 10/2019 | Baralia et al. |
| 2020/0220655 A1 | 7/2020 | Agarwal et al. |
| 2020/0329052 A1* | 10/2020 | Goyal .................. H04W 12/106 |
| 2020/0396028 A1* | 12/2020 | Haartsen .................. H04L 69/40 |
| 2021/0015200 A1 | 1/2021 | Tuli |

FOREIGN PATENT DOCUMENTS

| | | |
|---|---|---|
| WO | 2008113053 | 9/2008 |
| WO | 2018057524 | 3/2018 |
| WO | 2019129748 | 7/2019 |
| WO | 2019178107 | 9/2019 |

OTHER PUBLICATIONS

"International Search Report and Written Opinion received in International Application No. PCT/IB2020/051565 received Nov. 17, 2020."

"International Search Report and Written Opinion received in International Application No. PCT/IB2020/051566 received Nov. 13, 2020."

Afaneh, et al., "Understanding SN and NESN in a BLE Link Layer Packet", Novel Bits, Mohammad Afaneh, Nov. 11, 2016. https://www.novelbits.io/understanding-sn-nesn-ble-link-layer-packet/ [retrieved Sep. 14, 2020].

Nokia, et al., "CRC Attachment for eMBB Data", Alcatel-Lucent Shangai Bell; 3GPP Draft; R1-1612279_CRC Attachment, 3rd Generation Partnership Project (3GPP), Mobile Competence Centre; https://www.3gpp.org/.org/ftp/Meetings_3GPP_SYNC/RAN1/Docs/. Reno, U.S.A., Nov. 14-18, 2016.

* cited by examiner

SYSTEMS AND METHODS FOR MULTI-PROTOCOL ARBITRATION FOR HEARING DEVICES

BACKGROUND INFORMATION

In some situations, it is desirable for a hearing system that includes first and second hearing devices to render (e.g., acoustically present) streaming audio from an audio source (e.g., a Bluetooth-enabled smartphone or other device) to a user. To this end, the first hearing device may establish a wireless link (e.g., a Bluetooth link) with the audio source and receive audio packets transmitted from the audio source over the wireless link in accordance with an acknowledgement-based transmission protocol. The acknowledgement-based transmission protocol requires the first hearing device to acknowledge successful receipt of an audio packet transmitted by the audio source before the audio source transmits a subsequent audio packet.

For various reasons (e.g., technical limitations, power consumption constraints, etc.), it may be impossible or undesirable for the second hearing device to establish and maintain its own wireless link with the audio source while a wireless link is maintained between the first hearing device and the audio source. In these situations, as described in U.S. Patent Publication 2015/0319557, to facilitate rendering of the streaming audio by the second hearing device, the first hearing device may transmit eavesdropping instructions to the second hearing device by way of a wireless support link that interconnects the hearing devices. The eavesdropping instructions allow the second hearing device to eavesdrop on the wireless link established between the first hearing device and the audio source to receive the audio packets while the audio packets are being transmitted by the audio source over the wireless link. The first and second hearing devices may store the audio packets in respective buffers as the audio packets are received and render the audio by playing back the audio packets from the buffers. However, audio packets transmitted by the audio source may not always be received correctly by both the first hearing device and the second hearing device.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Exemplary systems and methods for multi-protocol arbitration by hearing devices and systems are described herein.

For example, a hearing device may comprise a memory storing instructions and a processor communicatively coupled to the memory and configured to execute the instructions to concurrently maintain a first link with an audio source and a second link with an additional hearing device. The processor may further scan, while not receiving audio data via the first link, the second link for a preamble of a binaural data packet for a first time period. The processor may further, based on whether the preamble is detected, selectively: receive the binaural data packet and ignore the first link while receiving the binaural data packet if the preamble of the binaural data packet is detected during the first time period, or scan the first link for a preamble of an audio data packet for a second time period if the preamble of the binaural data packet is not detected during the first time period.

The systems and methods described herein may advantageously provide many benefits to users of hearing devices. For example, the hearing devices described herein may provide audio to a user with fewer errors and/or delays than conventional hearing devices. The hearing devices may also be usable in environments with less reliable connectivity to audio sources than conventional hearing devices. For at least these reasons, the systems and methods described herein may advantageously increase performance, reliability, and ease of use for hearing device users compared to conventional hearing devices. These and other benefits of the systems and methods described herein will be made apparent herein.

As used herein, the term "audio packet" refers to any sample, portion, or other type of audio data representative of or otherwise associated with streaming audio that is provided by an audio source. An audio packet may be in any suitable format and may be transmitted in any suitable manner. While examples are described herein with reference to audio sources and audio packets, the systems and methods may be used by any suitable type of device with any data packet from any suitable type of data source.

Figure 1:
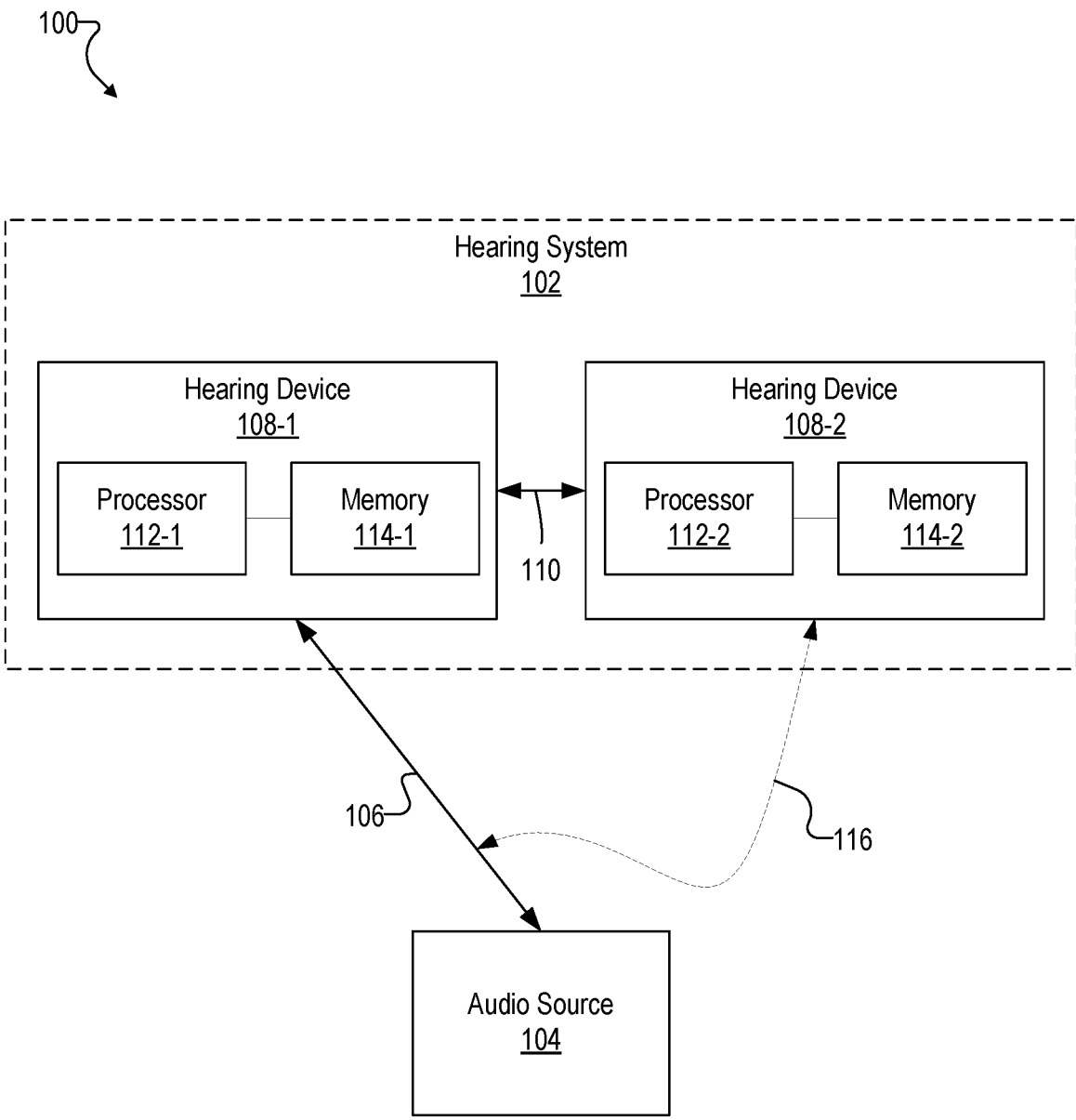
FIG. 1 illustrates an exemplary configuration in which a hearing system is configured to communicate with an audio source by way of a selectively established wireless link according to principles described herein.

FIG. 1 illustrates an exemplary configuration 100 in which a hearing system 102 (e.g., a binaural hearing system) is configured to communicate with an audio source 104 by way of a selectively established wireless link 106. As shown, hearing system 102 includes a first hearing device 108-1 and a second hearing device 108-2 (collectively "hearing devices 108"). Hearing devices 108 may communicate one with another by way of a wireless support link 110.

Audio source 104 may include any computing device that outputs streaming audio (e.g., speech, music, or other audio content output) and that is capable of being wirelessly connected with at least one of hearing devices 108. For example, audio source 104 may be a mobile device (e.g., a mobile phone such as a smartphone, a tablet computer, a laptop computer, a mobile gaming device), a desktop computer, a television, a speaker, etc. As described herein, audio source 104 may wirelessly transmit streaming audio to hearing system 102 in the form of sequential audio packets (e.g., discrete units or pieces of data representative of the streaming audio).

Hearing devices 108 may each be implemented by any type of hearing device configured to provide or enhance hearing to a user of hearing system 102. For example, hearing devices 108 may each be implemented by a hearing aid configured to apply amplified audio content to a user, a sound processor included in a cochlear implant system configured to apply electrical stimulation representative of audio content to a user, a sound processor included in an electro-acoustic stimulation system configured to apply electro-acoustic stimulation to a user, a head-worn headset, an ear-worn ear-bud or any other suitable hearing prosthesis. In some examples, hearing device 108-1 is of a different type than hearing device 108-2. For example, hearing device 108-1 may be a hearing aid and hearing device 108-2 may be a sound processor included in a cochlear implant system.

As shown, each hearing device 108 includes a processor and a memory. For example, hearing device 108-1 includes a processor 112-1 and a memory 114-1. Likewise, hearing device 108-2 includes a processor 112-2 and a memory 114-2.

Processors 112 (e.g., processor 112-1 and processor 112-2) are configured to perform various processing operations, such as receiving and processing streaming audio transmitted by audio source 104. Processors 112 may each be implemented by any suitable combination of hardware and software.

Memories 114 (e.g., memory 114-1 and memory 114-2) may be implemented by any suitable type of storage medium and may maintain (e.g., store) data utilized by processors 112. For example, memories 114 may store data representative of an operation program that specifies how each processor 112 processes and delivers audio content to a user. To illustrate, if hearing device 108-1 is a hearing aid, memory 114-1 may maintain data representative of an operation program that specifies an audio amplification scheme (e.g., amplification levels, etc.) used by processor 112-1 to deliver acoustic content output by audio source 104 to the user. As another example, if hearing device 108-1 is a sound processor included in a cochlear implant system, memory 114-1 may maintain data representative of an operation program that specifies a stimulation scheme used by hearing device 108-1 to direct a cochlear implant to apply electrical stimulation representative of acoustic content output by audio source 104 to the user. As will be described below, memories 114 may maintain buffers within which audio packets received from audio source 104 may be stored.

Hearing devices 108 may communicate with each other (e.g., by transmitting data) by way of a wireless support link 110 that interconnects hearing devices 108. Wireless support link 110 may include any suitable wireless communication link as may serve a particular implementation.

To facilitate communication between hearing system 102 and audio source 104, one of hearing devices 108 may establish a wireless link with audio source 104. For example, as shown in FIG. 1, hearing device 108-1 may establish wireless link 106 with audio source 104. Wireless link 106 may include a Bluetooth link (e.g., a Bluetooth classic link or a Bluetooth low energy link), a near field communication link, or any other suitable point-to-point link. To this end, hearing devices 108 and audio source 104 may each include a wireless interface configured to operate in accordance with any suitable wireless communication protocol.

Hearing device 108-1 may receive audio packets transmitted from audio source 104 over wireless link 106 in accordance with an acknowledgement-based transmission protocol (also referred to as an automatic repeat query ("ARQ") protocol). This may allow hearing device 108-1 to render (e.g., process and play back) streaming audio from audio source 104.

The acknowledgement-based transmission protocol requires hearing device 108-1 to acknowledge successful receipt of an audio packet transmitted by audio source 104 before audio source 104 transmits a subsequent audio packet. Exemplary acknowledgement-based transmission protocols include stop-and-wait ARQ, go-back-N ARQ, and selective repeat ARQ. A Bluetooth communication protocol, for example, may use any of these acknowledgement-based transmission protocols.

It may be desirable for hearing device 108-2 to also render streaming audio from audio source 104 while hearing device 108-1 renders the streaming audio. However, in some examples, hearing device 108-2 cannot or does not establish its own wireless link with audio source 104 while hearing device 108-1 is connected with audio source 104 by way of wireless link 106. For example, the communication protocol used by hearing devices 108 and audio source 104 to establish wireless links therebetween may not allow both hearing devices 108 to be concurrently connected to audio source 104.

In these examples, hearing device 108-2 may receive the audio packets transmitted from audio source 104 by eavesdropping on wireless link 106. This eavesdropping is illustrated by dashed line 116 in FIG. 1. Hearing device 108-2 may eavesdrop on wireless link 106 by passively listening to (e.g., having access to) data traffic (e.g., audio packets) transmitted between audio source 104 and hearing device 108-1. The eavesdropping may be done without audio source 104 being aware that hearing device 108-2 is accessing the data traffic and without hearing device 108-2 transmitting any data to audio source 104.

To enable eavesdropping by hearing device 108-2 on wireless link 106, hearing device 108-1 may transmit, over wireless support link 110, eavesdropping instructions to hearing device 108-2. The eavesdropping instructions may include information (e.g., frequency hopping sequence information, clock frequency and phase offset information, encryption key information, address information, etc.) that allows hearing device 108-2 to detect audio packets that are wirelessly transmitted from audio source 104 to hearing device 108-1. Hearing device 108-2 may accordingly use the eavesdropping instructions to eavesdrop on wireless link 106.

In this manner, hearing devices 108 may concurrently maintain a communication link with both audio source 104 (e.g., via wireless link 106 or eavesdropping on wireless link 106) and a communication link with each other (e.g., via wireless support link 110). Hearing device 108-1 and hearing device 108-2 may receive audio data from audio source 104 according to a first protocol, such as a Bluetooth protocol (e.g., a Bluetooth eavesdropping topology). Hearing device 108-1 and hearing device 108-2 may receive binaural data from each other according to a second protocol, such as any suitable binaural protocol. The first and second protocols may both use time domain multiplexing. As data may be received over one of the two links via one protocol at a time, hearing devices 108 may use algorithms to arbitrate between protocols on the two links. Example algorithms are described herein.

Figure 2:
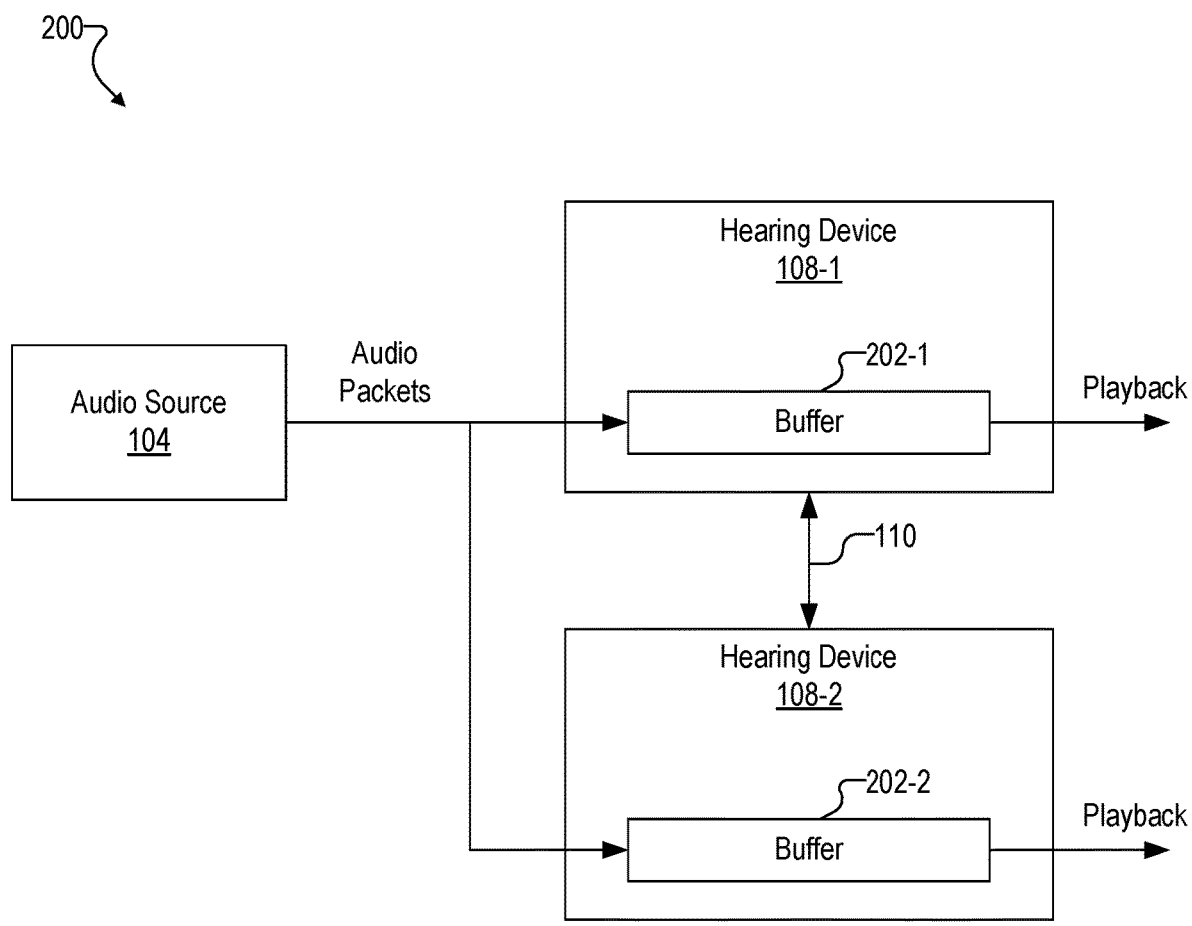
FIG. 2 illustrates an exemplary configuration in which hearing devices included in a hearing system both receive audio packets from the audio source into buffers according to principles described herein.

FIG. 2 illustrates an exemplary configuration 200 in which hearing devices 108 both render streaming audio from audio source 104. As shown, audio source 104 transmits sequential audio packets, which are received by both hearing device 108-1 and hearing device 108-2. As described in connection with FIG. 1, hearing device 108-1 may receive the audio packets over wireless link 106 and hearing device 108-2 may receive the audio packets by eavesdropping on wireless link 106.

As shown, hearing device 108-1 stores the audio packets in a buffer 202-1. Likewise, hearing device 108-2 stores the audio packets in a buffer 202-2. Buffer 202-1 and buffer 202-2 (collectively "buffers 202") may be maintained within memory 114-1 and memory 114-2, respectively, and may each be of any suitable size (e.g., buffers 202 may each store any suitable number of audio packets).

Hearing devices 108 may render streaming audio from audio source 104 by playing back audio packets stored within buffers 202. For example, hearing device 108-1 may render streaming audio from audio source 104 by playing back audio packets stored within buffer 202-1. Likewise, hearing device 108-2 may render streaming audio from audio source 104 by playing back audio packets stored within buffer 202-2. In so doing, the audio packets that are played back may be removed from buffers 202. Hearing devices 108 may use any suitable processing technique to play back audio packets stored within buffers 202.

Playback of audio packets in buffers 202 may occur while additional audio packets are being received and stored within buffers 202. In this manner, buffers 202 may allow continuous rendering of streaming audio from audio source 104 as the audio is generated and transmitted by audio source 104.

An audio packet may be stored in a buffer (e.g., one of buffers 202) in any suitable manner. For example, a decoded, transcoded, and/or decompressed version of an audio packet (instead of the audio packet itself) may be stored in a buffer.

In some instances, either hearing device 108-1 or hearing device 108-2 may miss (i.e., not receive) an audio packet, resulting in a discontinuity in received audio packets. Audio packets may be missed for various reasons, such as a transmission error, quality of a connection between hearing devices 108 and audio source 104, etc. Additionally, hearing devices 108 may discard audio packets for various reasons (e.g., an audio packet received with errors, etc.) which may be treated as a missed audio packet. When one of hearing devices 108 (e.g., hearing device 108-1) misses (or discards) an audio packet, the other hearing device 108 (e.g., hearing device 108-2) may relay the audio packet to hearing device 108-1. Receiving the missed audio packet from hearing device 108-2 may be more efficient than requesting a retransmission from audio source 104, as wireless support link 110 may be more stable than wireless link 106. However, as audio packets may be sent by audio source 104 asynchronously, it may not be obvious when either of hearing devices 108 has missed an audio packet. Hearing devices 108 may not determine that an audio packet has been missed until a subsequent audio packet in a sequence of audio packets is received. Thus, it may not be obvious when either of hearing devices 108 should look to receive audio data from the other of hearing devices 108 or from audio source 104. Therefore, an efficient algorithm to arbitrate between receiving binaural data from the other of hearing devices 108 and receiving audio data from audio source 104 may not be trivial.

Figure 3:
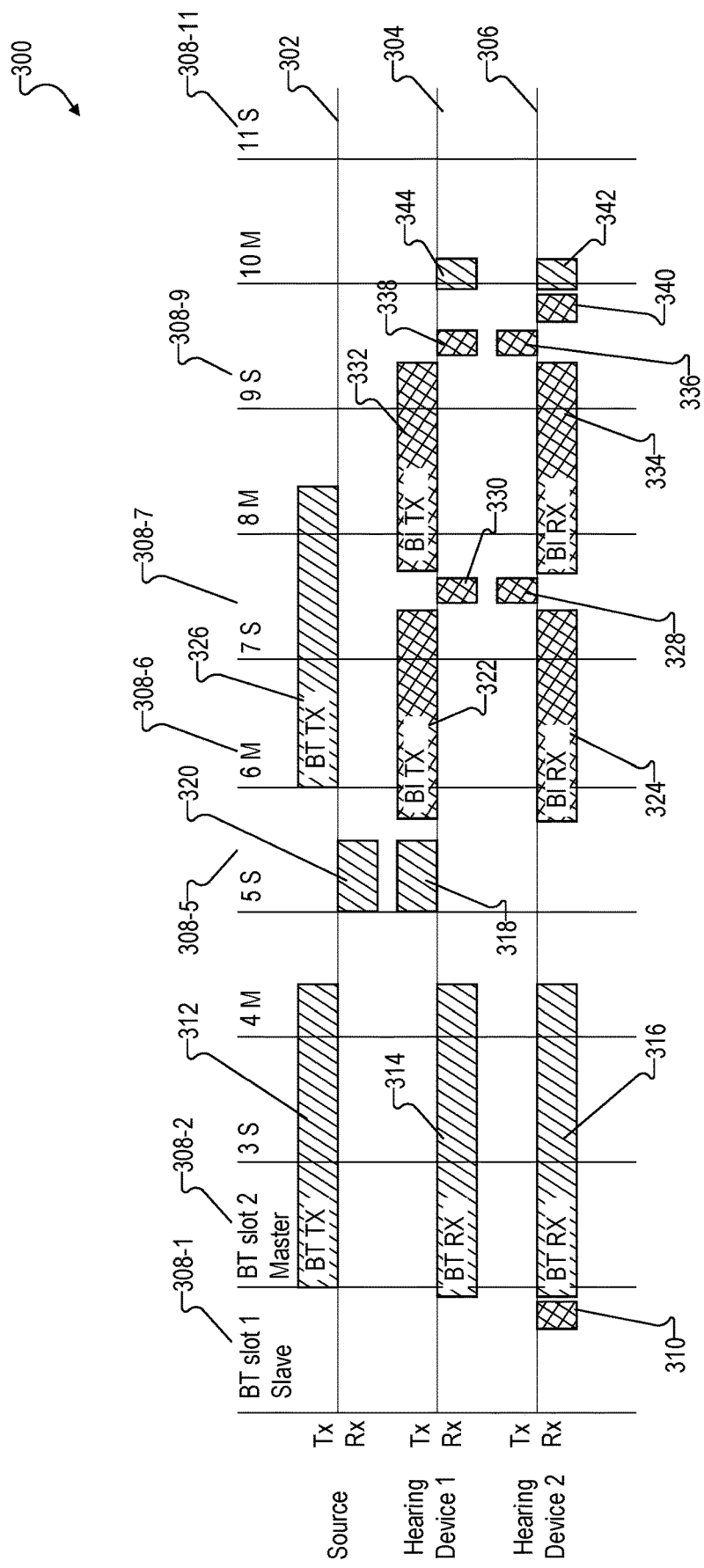
FIG. 3 illustrates an exemplary diagram of multi-protocol arbitration according to principles described herein.

FIG. 3 illustrates an exemplary diagram 300 of multi-protocol arbitration, such as for a hearing device (e.g., hearing device 108-2) arbitrating between a protocol for receiving audio data from an audio source (e.g., audio source 104) and a protocol for receiving audio from an additional hearing device (e.g., hearing device 108-1). Diagram 300 includes a line 302 showing data transmitted and received by audio source 104. A line 304 shows data transmitted and received by hearing device 108-1 and a line 306 shows data transmitted and received by hearing device 108-2.

In this example, hearing device 108-2 may concurrently maintain a first link with audio source 104 to receive audio data according to a first protocol and a second link with hearing device 108-1 to receive binaural data according to a second protocol. Audio data received from audio source 104 may typically include audio packets that are newer in a sequence of audio packets, while binaural data received from hearing device 108-1 may typically include audio packets being forwarded that have been missed by hearing device 108-2 and therefore are earlier in a sequence of audio packets. Receiving the earlier audio packets may be more significant to avoid interruptions in audio playback than receiving the newer audio packets. Binaural data may also include commands from the other hearing device, such as commands input by a user on the other hearing device (e.g., volume control, playback control, source selection, etc.). Thus, hearing device 108-2 may prioritize receiving binaural audio data from hearing device 108-1 over audio data from audio source 104. However, hearing device 108-2 may also refrain from interrupting data transmissions from either audio source 104 or hearing device 108-1.

As a result, hearing device 108-2 may scan, while not receiving audio data from audio source 104 via the first link, the second link for whether hearing device 108-1 has binaural data to transmit. Hearing device 108-2 may scan the second link for a first time period for a preamble of a binaural data packet as long as hearing device 108-2 is not receiving audio data via the first link. If hearing device 108-2 detects the preamble of the binaural data packet, hearing device 108-2 may receive the binaural data packet. Hearing device 108-2 may ignore the first link while receiving the binaural data packet to refrain from interrupting the data transmission from hearing device 108-1. Conversely, if hearing device 108-2 does not detect the preamble of the binaural data packet during the first time period, hearing device 108-2 may switch over to scan the first link for a preamble of an audio data packet from audio source 104.

For instance, diagram 300 depicts time slots 308 (e.g., time slots 308-1 through 308-11) during which hearing devices 108 and audio source 104 may transmit and receive data based on time division multiplexed protocols. Time slots 308 may alternate between master slots, during which audio source 104 may initiate a transmission of data, and slave slots, during which hearing devices 108 may initiate a transmission of data (e.g., acknowledgment messages to audio source 104, binaural data to the other of hearing devices 108, etc.). A block 310 shows hearing device 108-2 scanning the second link for a preamble of binaural audio data from hearing device 108-1 in a time slot 308-1, as hearing device 108-2 is not receiving audio data from audio source 104 during time slot 308-1. As shown, time slot 308-1 may be a slave slot. The first time period during which hearing device 108-2 scans the second link for binaural data may be a portion of a slave slot after a length of a typical acknowledgment message and before an end of the slave slot. By scanning the second link for a length of the first time period, hearing device 108-2 may receive binaural data if hearing device 108-1 is attempting to transmit binaural data, but also switch back over to scanning the first link for audio data if hearing device 108-1 does not have binaural data without missing a time slot for a potential transmission from audio source 104.

On scanning the second link at block 310, hearing device 108-2, may not detect a preamble of a binaural data packet, for instance, if hearing device 108-1 does not have a binaural data packet to transmit. As hearing device 108-2 does not detect a preamble of a binaural data packet, hearing device 108-2 may scan the first link for a preamble of an audio packet from audio source 104. Hearing device 108-2 may scan the first link for a second time period that may begin after the first period and at an end of time slot 308-1. As described, by scanning the first link at the end of time slot 308-1, hearing device 108-2 does not miss any potential transmissions from audio source 104. As shown in this instance, hearing device 108-2 detects a preamble of an audio packet from audio source 104 and in response, receives the audio packet transmitted by audio source 104. A block 312 indicates audio source 104 transmitting the audio packet. A block 314 indicates hearing device 108-1 receiving the audio packet and a block 316 indicates hearing device 108-2 receiving the audio packet. As described block 316 (and block 314) may start at an end of time slot 308-1 so that hearing device 108-2 (and hearing device 108-1) may be ready to receive the transmission by audio source 104 that starts at a time slot 308-2.

Transmitting and receiving the audio packet may span several time slots 308. As shown, blocks 312, 314, and 316 span 3 time slots, but audio packets may also span 5 time slots or any other suitable number of time slots. While hearing device 108-2 is receiving the audio packet at block 316, hearing device 108-2 may refrain from scanning the second link so that hearing device 108-2 may receive the audio packet without interruption.

Upon receiving the audio packet at block 314, hearing device 108-1 may transmit an acknowledgment message, shown by a block 318 at a time slot 308-5. Audio source 104 may receive the acknowledgment message, shown by a block 320. After a length of time for sending the acknowledgment message, hearing device 108-2 may scan the first link during time slot 308-5 for a preamble of a binaural data packet. In this instance, hearing device 108-2 detects the preamble of the binaural data packet that is transmitted by hearing device 108-1, as shown by a block 322. In response, hearing device 108-2 receives the binaural data packet from hearing device 108-1, as shown by a block 324. While hearing device 108-2 is receiving the binaural data packet, hearing device 108-2 may ignore the first link so that hearing device 108-2 may receive the binaural data packet without interruption. Thus, while audio source 104 starts transmitting an additional audio packet at a time slot 308-6, shown by a block 326, neither hearing device 108-1 nor hearing device 108-2 receive the additional audio packet. Rather, hearing device 108-1 continues transmitting the binaural data packet (shown by block 322) and hearing device 108-2 continues receiving the binaural data packet (shown by block 324).

After receiving the binaural data packet at a time slot 308-7, hearing device 108-2 may transmit an acknowledgment message to hearing device 108-1, shown by a block 328. Hearing device 108-1 may receive the acknowledgment message, shown by a block 330. As time slot 308-7 is a slave slot and hearing device 108-2 is not receiving audio data from audio source 104 (despite audio source 104 still transmitting the additional audio packet), hearing device 108-2 may scan the second link for a preamble of an additional binaural data packet. As shown, hearing device 108-1 may transmit an additional binaural data packet, shown by a block 332. Thus, hearing device 108-2 may detect the preamble of the additional binaural data packet, and in response, receive the additional binaural data packet via the second link, as shown by a block 334. In this manner, a plurality of queued binaural data packets may be transmitted in a burst without switching to the first link.

After receiving the additional binaural data packet at a time slot 308-9, hearing device 108-2 may transmit an additional acknowledgment message to hearing device 108-1, shown by a block 336. Hearing device 108-1 may receive the additional acknowledgment message, shown by a block 338. As time slot 308-9 is a slave slot and hearing device 108-2 is not receiving audio data from audio source 104, hearing device 108-2 may scan the second link for a preamble of another binaural data packet, shown by a block 340. In this case, hearing device 108-1 is not transmitting another binaural data packet, and therefore hearing device 108-2 does not detect a preamble of a binaural data packet. In response, hearing device 108-2 may scan the first link for a preamble of another audio packet, shown by a block 342. Hearing device 108-1 may also scan the first link for the preamble of another audio packet, shown by a block 344. However, in this instance, as audio source 104 is not transmitting an audio packet, hearing devices 108 may wait for a next slave time slot to repeat the arbitration of multiple protocols. Additionally or alternatively, hearing devices 108 may scan the second link periodically, such as every slave time slot, every second slave time slot, every third slave time slot, etc. Additionally or alternatively, each of hearing devices 108 may take turns scanning the second link for binaural data to be received from the other of hearing devices 108.

In this manner, hearing device 108-2 may arbitrate between protocols by placing a priority on a protocol from hearing device 108-1 (e.g., a binaural protocol) over a protocol from audio source 104 (e.g., a Bluetooth protocol). However, hearing device 108-2 may further prioritize receiving data from either protocol, ignoring either protocol if data is being received on the other. Additionally, scanning the binaural protocol for a specified time period in specified time slots may allow hearing device 108-2 to prioritize data received via the binaural protocol while minimizing missed audio packets via the Bluetooth protocol. In this manner, latency for the system may be minimized.

Figure 4:
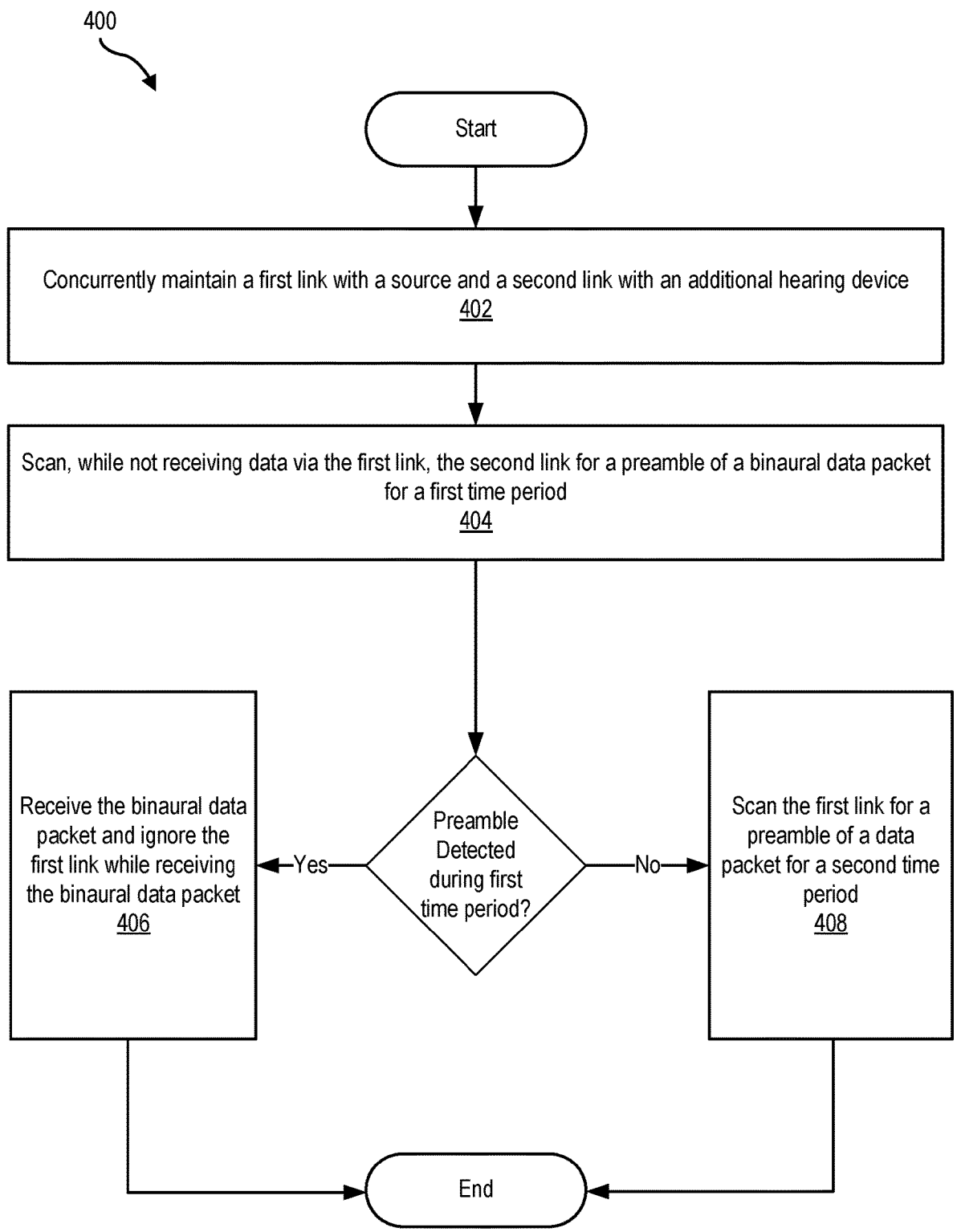
FIG. 4 illustrates an exemplary method for multi-protocol arbitration according to principles described herein.

FIG. 4 illustrates an exemplary method 400. One or more of the operations shown in FIG. 4 may be performed by any of the hearing devices described herein. While FIG. 4 illustrates exemplary operations according to one embodiment, other embodiments may omit, add to, reorder, and/or modify any of the operations shown in FIG. 4.

In step 402, a processor of a hearing device concurrently maintains a first link with an audio source and a second link with an additional hearing device. Step 402 may be performed in any of the ways described herein.

In step 404, the processor scans, while not receiving audio data via the first link, the second link for a preamble of a binaural data packet for a first time period. Step 404 may be performed in any of the ways described herein.

If the processor detects the preamble of the binaural data packet during the first time period, in step 406, the processor receives the binaural data packet and ignore the first link while receiving the binaural data packet. Step 406 may be performed in any of the ways described herein.

If the processor does not detect the preamble of the binaural data packet during the first time period, in step 408, the processor scans the first link for a preamble of an audio data packet for a second time period. Step 408 may be performed in any of the ways described herein.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A hearing device comprising:
a memory storing instructions; and
a processor communicatively coupled to the memory and configured to execute the instructions to:
concurrently maintain a first link with a source and a second link with an additional hearing device;
scan, while not receiving data via the first link, the second link for a preamble of a binaural data packet for a first time period, wherein the first time period is during a portion of a time slot configured for sending an acknowledgment message from the hearing device to the source; and
based on whether the preamble is detected, selectively:
receive the binaural data packet and ignore the first link while receiving the binaural data packet if the preamble of the binaural data packet is detected during the first time period, and
scan the first link for a preamble of a data packet for a second time period if the preamble of the binaural data packet is not detected during the first time period.

2. The hearing device of claim 1, wherein the additional hearing device is configured to also receive the data from the source.

3. The hearing device of claim 1, wherein the binaural data packet includes a forwarding of a previous data packet received from the source.

4. The hearing device of claim 1, wherein the binaural data packet includes a command from the additional hearing device.

5. The hearing device of claim 1, wherein the first link is a Bluetooth link.

6. The hearing device of claim 5, wherein the additional hearing device is configured to receive the data via a Bluetooth eavesdropping topology.

7. The hearing device of claim 1, wherein the portion of the time slot is after a length of the acknowledgment message.

8. The hearing device of claim 1, wherein the second time period starts after the first time period and during the time slot configured for sending the acknowledgment message.

9. The hearing device of claim 1, wherein the second time period ends before an end of the time slot configured for sending the acknowledgment message.

10. The hearing device of claim 1, wherein:
the source is an audio source;
the data is audio data; and
the processor is further configured to execute the instructions to render audio represented by the audio data.

11. A system comprising:
a first hearing device and a second hearing device,
the first hearing device configured to:
concurrently maintain a first link with a source and a second link with the second hearing device;
scan, while not receiving data via the first link, the second link for a preamble of a binaural data packet for a first time period, wherein the first time period is during a portion of a time slot configured for sending an acknowledgment message from the first hearing device to the source; and
based on whether the preamble is detected, selectively:
receive the binaural data packet and ignore the first link while receiving the binaural data packet if the preamble of the binaural data packet is detected during the first time period, and
scan the first link for a preamble of a data packet for a second time period if the preamble of the binaural data packet is not detected during the first time period.

12. The system of claim 11, wherein the second hearing device is configured to:
concurrently maintain a third link with the source and the second link with the first hearing device;
scan, while not receiving data via the third link, the second link for a preamble of an additional binaural data packet for a third time period; and
based on whether the preamble is detected, selectively:
receive the additional binaural data packet and ignore the third link while receiving the additional binaural data packet if the preamble of the additional binaural data packet is detected during the third time period, and
scan the third link for a preamble of an additional data packet for a fourth time period if the preamble of the additional binaural data packet is not detected during the third time period.

13. The system of claim 12, wherein:
the third time period is a same time period as the first time period; and
the fourth time period is a same time period as the second time period.

14. The system of claim 12, wherein the third link is a Bluetooth eavesdropping link.

15. The system of claim 11, wherein the binaural data packet includes a forwarding of a previous data packet received from the source.

16. The system of claim 11, wherein the binaural data packet includes a command from the second hearing device.

17. The system of one claim 11, wherein the first link is a Bluetooth link.

18. A method comprising:
concurrently maintaining, by a processor, a first link with a source and a second link with an additional processor;
scanning, by the processor, while not receiving data via the first link, the second link for a preamble of a binaural data packet for a first time period, wherein the first time period is during a portion of a time slot configured for sending an acknowledgment message to the source; and
based on whether the preamble is detected, selectively:
receiving, by the processor, the binaural data packet and ignoring the first link while receiving the binaural data packet if the preamble of the binaural data packet is detected during the first time period, and
scanning, by the processor, the first link for a preamble of a data packet for a second time period if the preamble of the binaural data packet is not detected during the first time period.

* * * * *